United States Patent
Delmas et al.

(10) Patent No.: US 10,158,923 B2
(45) Date of Patent: Dec. 18, 2018

(54) METHOD OF BROADCASTING CONTENTS BY STREAMING IN A PEER-TO-PEER NETWORK

(71) Applicant: STREAMROOT, Arcueil (FR)

(72) Inventors: Axel Delmas, Paris (FR); Nikolay Rodionov, Paris (FR)

(73) Assignee: STREAMROOT, Arcueil (FR)

( * ) Notice: Subject to any disclaimer, the term of this patent is extended or adjusted under 35 U.S.C. 154(b) by 0 days.

(21) Appl. No.: 15/517,479

(22) PCT Filed: Oct. 9, 2015

(86) PCT No.: PCT/EP2015/073469
§ 371 (c)(1),
(2) Date: Apr. 6, 2017

(87) PCT Pub. No.: WO2016/055645
PCT Pub. Date: Apr. 14, 2016

(65) Prior Publication Data
US 2017/0311046 A1    Oct. 26, 2017

(30) Foreign Application Priority Data
Oct. 9, 2014  (FR) ..................... 14 59682

(51) Int. Cl.
| | |
|---|---|
| *H04N 21/63* | (2011.01) |
| *H04L 29/06* | (2006.01) |
| *H04L 29/08* | (2006.01) |

(52) U.S. Cl.
CPC ....... *H04N 21/632* (2013.01); *H04L 65/4069* (2013.01); *H04L 65/4084* (2013.01);
(Continued)

(58) Field of Classification Search
CPC .............. H04N 21/632; H04L 65/4069; H04L 65/4084; H04L 67/104
See application file for complete search history.

(56) References Cited

U.S. PATENT DOCUMENTS

| | | |
|---|---|---|
| 2006/0218222 A1 | 9/2006 | Brahmbhatt et al. |
| 2014/0280563 A1* | 9/2014 | El-Beltagy .......... H04L 67/1068 709/204 |
| 2015/0181165 A1* | 6/2015 | Iltus ........................ H04N 7/15 348/14.09 |

FOREIGN PATENT DOCUMENTS

WO    WO-2012154287    11/2012

OTHER PUBLICATIONS

Streamroot, "French Preliminary Search Report," FR Application No. 1459682 (dated Sep. 4, 2015) (with English translation cover sheet).

(Continued)

*Primary Examiner* — Sumaiya A Chowdhury
(74) *Attorney, Agent, or Firm* — Womble Bond Dickinson US (LLP)

(57) ABSTRACT

The present invention relates to a method of broadcasting a content by streaming in a peer-to-peer network (10) of client devices (11, 12, 13) which is connected to a content server (2), said content consisting of a sequence of segments stored on data storage means of the content server (2), each client device (11, 12, 13) comprising a buffer memory storing in a temporary manner at least one segment of said content, the method being characterized in that each client device (11, 12, 13) is associated with a level defining a minimal list of segments of the content that have to be stored by the buffer memory of the device (11, 12, 13), the method comprising steps of: (a) connection of a new client device (14) to the peer-to-peer network (10); (b) assignment of a level to the new client device (14) as a function of the number of client devices (11, 12, 13) associated with each level; (c) transmission to said new client device (14) from the server (2) of at least each segment of the content which is absent from the buffer memory of the new client device (14), which belongs (Continued)

to said list of segments of the content corresponding to the level assigned to the new client device (14).

15 Claims, 2 Drawing Sheets

(52) U.S. Cl.
CPC ........ *H04L 67/104* (2013.01); *H04L 67/1046* (2013.01); *H04L 67/1068* (2013.01); *H04L 67/1076* (2013.01)

(56) References Cited

OTHER PUBLICATIONS

Streamroot, "International Search Report," PCT Application No. PCT/EP2015/073469 (dated Dec. 16, 2015) (with English translation cover sheet).

Small, et al., "Scaling Laws and Tradeoffs in Peer-to-Peer Live Multimedia Streaming," ACM Multimedia 2006 & Co-Located Workshops (Oct. 23-27, 2006).

\* cited by examiner

METHOD OF BROADCASTING CONTENTS BY STREAMING IN A PEER-TO-PEER NETWORK

GENERAL TECHNICAL FIELD

The present invention relates to a method of broadcasting a content by streaming in a peer-to-peer network.

STATE OF THE ART

"Streaming" designates a "direct" audio or video stream playing technique, that is while it is recovered from the Internet by a client device. Thus, it is in contrast with downloading, which requires to recover all the data of the audio or video content before being able to play it.

In the case of streaming, storing the content is temporary and partial, since data are continuously downloaded in a buffer of the client (typically the random access memory), analysed on the fly by its processor and quickly transferred to an output interface (a screen and/or loudspeakers) and then replaced with new data.

Traditionally, the content is provided by a streaming server. The client desiring to access it sends a request to recover first segments therefrom (by segment, it is intended a data block of the content, corresponding generally to a few seconds of playing). When there is sufficient data in the buffer to enable the beginning of the content to be played, playing starts. In the background, the stream downloading continues in order to uninterruptedly supply the buffer with the remaining part of the content.

However, it is noticed that this approach has limits if a great number of clients desire to play the same content simultaneously: the server is found to be saturated, being incapable of providing the content at a sufficient rate for playing to be fluid, and jerks occur.

Recently, an alternative strategy based on "peer-to-peer" (P2P) has been suggested, in which each client acts as a server for other clients: they are called peers. A peer which has started playing the content will forward to others segments it has already received, and so on, hence an easier broadcasting regardless of the number of clients being interested. This strategy is described in the international application WO 2012/154287.

However, although P2P is extremely efficient for downloading files, difficulties occur when it is used for streaming. Indeed, insofar as storing a streamed content is partial and temporary, some peers must download data from a server to be able to serve to other peers. Furthermore, a downloaded content can be in either order: each of its blocks can be independently recovered. Yet, for streaming, the playing order of its blocks, called segments must be fulfiled (each segment corresponding typically to 1 to 8 seconds of the content, in particular 1 to 4 seconds for live streaming and 3 to 8 seconds for video on demand, see later).

Thus, there can be paradox cases where very numerous peers would have for example central segments of a content, but not those of the beginning, hence the server must be heavily appealed to by new peers otherwise they cannot start playing.

Moreover, not all the peers have the same upload ability, that is sending data to other peers, which further complicates stream management.

On the other hand, a particular case of streaming, that is "Live Streaming" turns out to be even more complex to manage. Live streaming proposes to broadcast in real time contents associated with "live" events, for example concerts, meetings, sports events, video games, etc., which are simultaneously happening. With respect to streaming of an already integrally existing content as a film, a live streaming broadcast content is actually generated gradually as the associated event happens. Technically, as in the case of a live event on TV, such a content can only be broadcast with some delay, which the user wishes to be as small as possible. This delay is typically in the order of one minute, but can go down to about twenty seconds. Thereby, a playlist of only a few segments (at most some tens) is available at each instant, the segments of this list being dynamically renewed in accordance with a turnover: as the event happens, new segments are created, "age", are received and played by clients (at the end of the expected delay), and finally exit the list.

The present invention improves the situation by providing a novel method for managing peers in P2P streaming, in particular P2P live streaming, which is optimum in terms of content broadcasting efficiency, occupancy of the buffers of the peers, and algorithmic simplicity.

DISCLOSURE OF THE INVENTION

The present invention relates to a method of broadcasting a content by streaming in a peer-to-peer network of client devices which is connected to a content server, said content consisting of a sequence of segments stored in data storage means of the content server, each client device comprising a buffer storing in a temporary manner at least one segment of said content, the method being characterised in that each client device is associated with a level defining a minimum list of segments of the content that have to be stored by the buffer of the device, the method comprising steps of:
 (a) connecting a new client device to the peer-to-peer network;
 (b) assigning a level to the new client device as a function of the number of client devices associated with each level;
 (c) transmitting to said new client device from the server at least each segment of the content which is absent from the buffer of the new client device, which belongs to said list of segments of the content corresponding to the level assigned to the new client device.

According to other advantageous and non-limiting characteristics:
 step (c) comprises transmitting to said new client device from client devices associated with a level higher than the level assigned to said new client device at least one segment of the content which is absent from the buffer of the new client device, which does not belong to said list of segments of the content corresponding to the level assigned to the new client device;
 the peer-to-peer network is further connected to a pair management server configured to manage transmitting segments between client devices, step (b) being implemented by the pair management server (3);
 step (a) comprises directly transmitting to said new client device from the server at least one first segment of the content;
 the client devices are classified in L levels, each level k∈[1, L] defining a list of the $s_k$ consecutive first segments of the sequence of segments making up the content;
 the number $s_k$ of segments increases with the level k;
 the client devices are classified in L levels, each level k∈[1, L] defining a list of segments corresponding to a minimum duration $t_k$ of the content;

step (b) consists in identifying and assigning to the new client device the smallest level k∈[1, L] such as ∀i∈ [k+1, L], $n_i > C \cdot n_{i-1}$, where $n_i$ designates the number of client devices of the peer-to-peer network associated with the level i;

C is a coefficient depending on the state of the network calculated by the pair management server;

the content is broadcast in live, the sequence of segments making up the content being updated at regular intervals such that at each update, the first segment of the sequence is deleted, and a new segment is added at the end of the sequence;

each minimum list of segments of the content defining a level is updated accordingly at each update of the sequence of segments making up the content;

a client device has a content playing delay with respect to the new client device, step (c) comprising decreasing the level assigned to said delayed device;

step (c) comprises exchanging levels between the new client device and another client device with a different level;

for each client device with a different level from the new client device and the new client device, a heuristic is calculated, the new client device exchanging levels with another client device with a different level if the heuristic of the client device with the highest level is lower than the heuristic of the client device with the lowest level;

calculating the heuristic of a client device comprises the steps of initialising the heuristic H of the client device to a mean value;

regularly updating the heuristic H of the client device depending on a received segment counter and a timeout counter for said client device;

the method comprises at each update of the sequence of segments:

if each segment of the content belonging to said list of segments of the content corresponding to the level assigned to the new client device is present in the buffer of the new client device, decreasing the level assigned to the new device as long as said level remains above a minimum level, if at least one segment of the content belonging to said list of segments of the content corresponding to the level assigned to the new client device is absent from the buffer of the new client device, assigning a maximum level to the new device.

According to a second and a third aspect, the invention respectively relates to a computer program product comprising code instructions for executing a method according to the first aspect of the invention of broadcasting a content in streaming in a peer-to-peer network of client devices which is connected to a content; and a storage means readable by a computing device on which a computer program product comprises code instructions for executing a method according to the first aspect of the invention of broadcasting a content in streaming in a peer-to-peer network of client devices which is connected to a content server.

DESCRIPTION OF THE FIGURES

Further characteristics and advantages of the present invention will appear upon reading the description that follows of a preferential embodiment. This description will be given in reference to the appended figures in which.

DETAILED DESCRIPTION

Architecture

Figure 1:
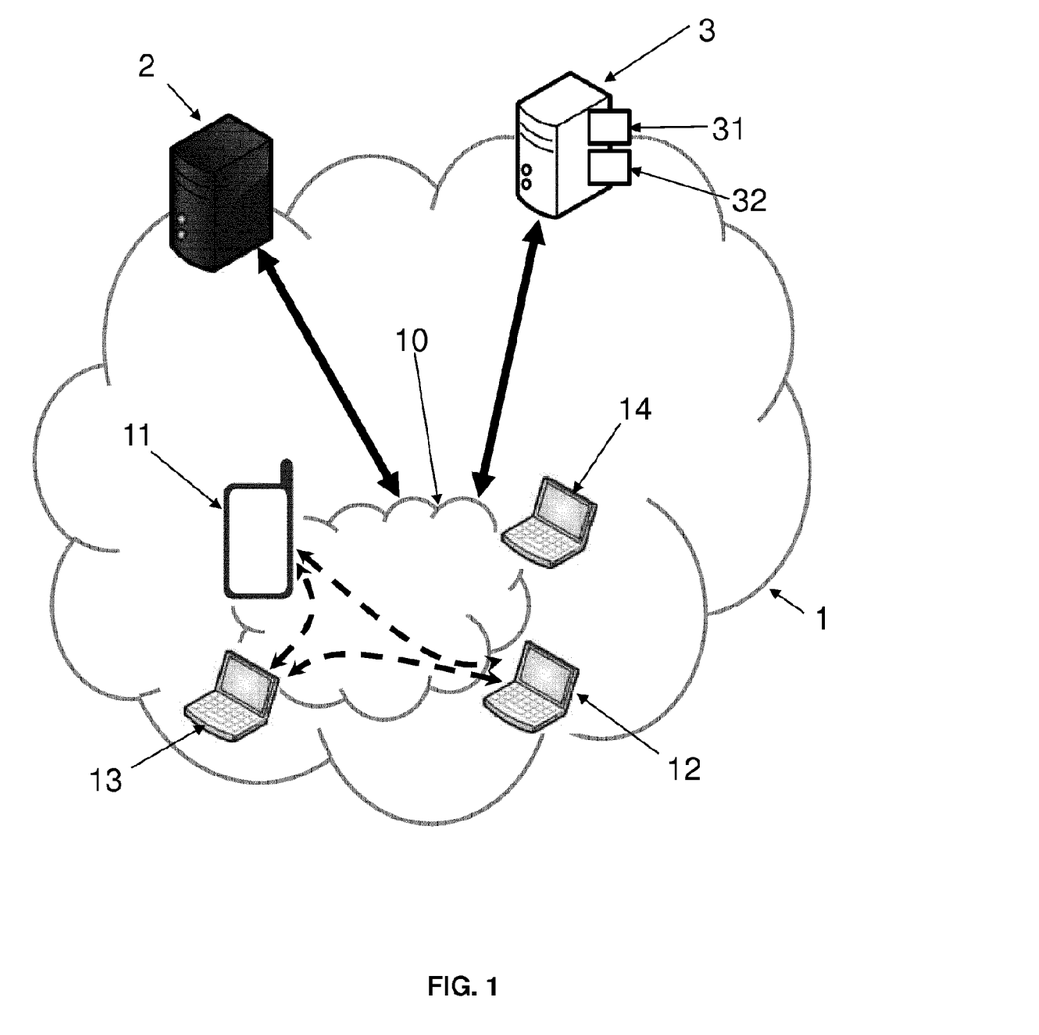
FIG. 1 represents an architecture for implementing the method according to the invention.

In reference to FIG. 1, the invention provides a method of broadcasting a content by streaming in a network 1 as represented. The network 1 is here a large scale telecommunications network, and in particular the Internet. This network 1 comprises a peer-to-peer network 10 of client devices 11, 12, 13 (to which a new client device 14 of the same type will be added, as will be seen). Each client device 11, 12, 13 is typically a personal computing device such as a smartphone, a PC, a tablet, etc. connected to the network 1, having data processing means such as a processor, an interface for playing content, and having a buffer, typically a zone of a random access memory, that can temporarily store as will be seen all or part of a content (by temporarily, it is meant that the segments are deleted from this memory shortly after they have been played: they are not stored in the long term as is the case for a direct downloading).

As explained in the introductive part, these devices 11, 12, 13 are "peers" (also called "nodes") of the peer-to-peer network 10.

By "client devices 11, 12, 13 of a peer-to-peer network 10", it is meant devices connected in the network 1 by a peer-to-peer network protocol. In other words, the data processing means for each peer implements a particular program (client software), which can be integrated to a web browser, for using the peer-to-peer.

Indeed, a peer-to-peer network, or P2P, is a decentralised sub-network within the network 1, wherein data can be directly transferred between two client devices 11, 12, 13 of the network 10, without passing through a central server. Thus, it enables all the client devices 11, 12, 13 to play both the role of client and server. The peers 11, 12, 13 are thus defined as "seeders" (or data suppliers) and/or "leechers" (or data receivers).

Said content, which is in particular an audio or video content, that is a media of some length, consists of a sequence of segments (called a "playlist") stored on data storage means of a server 2 connected to the peer-to-peer network 10. The segments have a predetermined length, typically one or two seconds of the content, but it can range from a fraction of a second to about ten seconds. All the segments of a given content have generally the same length. As will be seen later, it is possible for convenience to define the segments of a content by the times of the associated content, which makes it possible to be dispensed with the notion of a segment length. For example, in the case where segments will be of two seconds, the "first four seconds of the content" refer to the first two segments.

The server 2 is a content server. In other words, this is one (or more) server(s) of the Internet network 1 providing the segments of various contents in accordance with a given streaming protocol. For example, the HLS ("HTTP Live Streaming") will be mentioned, in which segments are "ts" files, listed in a "m3u8" playlist file. HLS involves the MPEG2 format for the content. DASH, Smooth streaming, or HDS streaming protocols will also be mentioned.

The server 2 is the primary source of the segments, insofar as initially no peer has the content (before a first transfer of the server 2 to this peer 11, 12, 13). The contents are either at the very beginning stored integrally on the server 2 (case of the VOD "Video On Demand" or the video in differed time), or generated in real time (case of the live streaming), and in the latter case, the list of segments making it up dynamically changes over time.

More precisely, in the latter case (live streaming), the content should rather be seen as a continuous stream. The sequence of segments is thereby dynamic, that is it is regularly updated. Each time a new segment is generated, it is added at the end of the sequence, and the first segment of the sequence (the oldest) is deleted. All the others are offset according to a turnover mechanism which can be related to a FIFO list. The first segment of the list (the oldest one) can be that at the playing point, in other words the "live" segment (and thus the segments are deleted from the playlist as soon as they are played), or a "past" segment if the content server accepts that the content is played with some delay (some platforms provide live streaming with up to a 2 h delay). It is noted that dynamic playlists can also be used for VOD.

In the following of the present application, the preferred embodiment will be considered in which the playlist is dynamic (example of live streaming), and it will be assumed that at any time, the first segment of the sequence is the "next" segment that will be played, the second segment is the next second one that will be played, etc., and the last segment of the sequence is that the existence of which is the latest, and which will be played when all the other segments of the sequence will have been played and it will become the first one (at this time, other news segments will have completed the sequence by replacing all those that will already have been played). Alternatively, the list of segments is static.

To the peer-to-peer network 10 is also connected a peer management server 3 called a "tracker". The tracker 3 has data processing means 31 and storage means 32. It coordinates exchanges between peers 11, 12, 13 (by controlling the client software implemented by each of the client devices 11, 12, 13), but it is not directly involved in data transfer and does not have a copy of the file.

On the other hand, it communicates with the content server 2. For each of the contents stored on this server 2, the tracker 3 receives (upon request or by push) from the server 2 a "manifest" file for each of the contents. This manifest file is a description of the content (in the XML format for most of streaming protocols except for HLS), and contains in particular the list of the segments. The tracker 3 then parses the manifest file so as to extract the list of the segments.

In the case of live streaming, the manifest file is generally retransmitted at regular intervals so as to allow an update of the playlist (it is reminded that as the content is generated live, new segments continuously enter the playlist and others leave it when they have become too old and have gone beyond the play point). Alternatively, a manifest template (that is without the list of the segments) is provided accompanied with time indications (including a "timestamp") making it possible to determine when each new segment is transmitted, which enables the tracker 3 (and the client devices 11, 12, 13, 14, as will be seen later) to complete this template and to update it on its own.

For each manifest file (obtained as complete or the playlist of which has been automatically completed), the tracker 3 makes a "hash", that is implements a hash function so as to obtain a digest of the manifest file, which makes up a signature of the content to which the manifest file is associated, and the usefulness of which will be seen later. It is to be noted that the hash can be implemented on the address of the manifest file (its URL, "Uniform Resource Locator"), which is interesting since an URL remains constant even if the manifest file regularly changes (because of the live streaming).

Connecting a New Client Device to the Peer-to-Peer Network

In the following of the present description, it is assumed that the peer-to-peer network also comprises a client device 11, 12, 13 already comprising on its buffer at least one segment of the content to be broadcast, and that a new device 14 (on the buffer of which no segment of the content is still available) is connecting to peer-to-peer network 10 in a step (a), in order to recover a given content.

In the opposite case, if the peer-to-peer network 10 would not comprise any client device 11, 12, 13 or that none of these devices would have any segment of content (in other words, that the new device 14 is the first to wish to look at this content), then the new device would have no other choice than recovering the content integrally from the content server 2 (since it is not available anywhere).

In the case where at least one segment is already available, how the content is broadcasted will be explained.

In a known manner, the new client device 14 connects to the content server 2 and selects the content it desires to be played (as explained, it is assumed to be in a live streaming and thus that the content is generated live).

The server 2 transmits to the client the manifest file of the content, and this client performs parsing to obtain the (current) list of the segments of the sequence. Preferably, step (a) then comprises directly (that is before setting a possible peer-to-peer transfer) transmitting to said new client device 13 from the server 2 at least one first (in accordance with the sequence) segment of the content, in other words the next one to be played. This enables the user to start playing the content as soon as possible for a maximum comfort. A minimum preloading duration can be contemplated, for example ten seconds (that is five segments of two seconds). This transmission is performed upon request of the client device 14.

During this time, the new client device 14 performs hashing of the manifest file and sends the associated digest to the tracker 3. The latter compares it with the ones it has available, and thus identifies the associated content, so as to initiate segment transfers between client devices 11, 12, 13, 14.

Priority Levels

In the prior art, it is known to recover segments from the content server 2 or other devices 11, 12, 13 according to a given rule: if sufficient advance segments are stored in the buffer of the new client device 14, then a transfer between devices of the peer-to-peer network 10 is favoured, otherwise a transfer from the server 2 is requested.

This corresponds to the previously discussed preloading mechanism: the device 14 ensures that he always has a predetermined minimum duration of the content stored on the buffer, for example ten seconds (that is five segments of two seconds). This minimum duration is called the criticality margin.

This theoretically enables the user to have a maximum comfort. However, it is noticed that when a segment is too rare, numerous devices will simultaneously have to load it from the server 2, which will be saturated and incapable of serving it quickly enough to everybody, which will result in blocking playing of the content for numerous users.

This is particularly likely to occur in live streaming, since on the one hand playing is synchronised (all the users play the same segments in the meantime), and on the other hand the criticality margin can only be very short (as explained, the playlist only contains to the maximum a few tens of segments).

In the case where the server 2 is saturated, the users will have to wait until their device sufficiently "rebuffers" segments, which is very annoying insofar as users can notice jerks, or even a full playing interruption for several seconds, which is very annoying upon broadcasting a live content (we can imagine the anger of a user which would miss a goal during a soccer match).

The present method of broadcasting a content by streaming in the peer-to-peer network 10 is distinguished in that it suggests to generate in a controlled way an offset between the server downloadings of different client devices 11, 12, 13, 14 to make broadcasting of segments between peers easier.

This offset is achieved via assigning to the peers in a step (b) (which is implemented preferably by the tracker 3 and which will be described in more detail later) "priority levels", each defining a minimum list of segments of the content that have to be stored by the buffer of the device 11, 12, 13, 14. More precisely, the segments of this list are recovered from the server 2 if they are missing. It will be understood that these "priority levels" have nothing to do with the "distribution/proximity levels" that can be seen in some known architectures, and which typically designate a number of hops between the peer and the content server. In particular, the server sends to the level-1 peers, which send to the level-2 peers, etc. In case of an absence of reply to requests of segments, peers with increasingly low level are successively looked at, up to the server (which can be seen as the "level-0" device). In comparison with the present method, the distribution levels have no impact on the operation of the buffer of the peers.

In others words, the present method comprises a step (c) of transmitting (always on request of the client device 14: this is it that identifies the missing segments it should have on its buffer, and requests them to the server 2) to said new client device 14 from the server 2 of at least each segment of the content which:
  is absent from the buffer of the new client device 14, and which
  belongs to said list of segments of the content corresponding to the level assigned to the new client device 14.

If possible, the other segments are recovered from peers, that is step (c) preferentially consists in transmitting (still upon request of the client device 14) to said new client device 14 of each segment of the content absent from the buffer of the new client device 14:
  from the server 2 if the segment belongs to said list of segments of the content corresponding to the level assigned to the new client device 14;
  from the client devices 11, 12 associated with a level higher than the level assigned to said new client device 14 otherwise (i.e. transmitting at least one segment of the content absent from the buffer of the new client device 14, which does not belong to said list of segments of the content corresponding to the level assigned to the new client device 14).

It is to be noted that within the scope of recovering segments within the peer-to-peer network 10 (i.e. from other client devices), the segment, which is a video data unit, is subdivided into sub-units called "chunks" with a smaller fixed size. A result therefrom is that different chunks of a same segment can be requested to different peers (and thus a segment can finally come from a plurality of client devices 11, 12, 13).

Preferably, in the hypothesis where there are L levels, each level k ε [1, L] defines a list of the $s_k$ first consecutive segments of the content (possibly within one offset), in other words the $s_k$ next segments that will be played.

This is equivalent to variable criticality margins: indeed, since the segments have generally an equivalent (and often constant) duration, imposing the presence of $s_k$ advance segments amounts to imposing to have $s_k$*duration_segment seconds of content present on the buffer.

And further preferably, the number $s_k$ of segments increases with the level k. This means that the client devices 11, 12, 13, 14 with a low priority level will only have to recover from the server 2 a small number of first segments, the other being recovered from the peer-to-peer network 10, whereas those having a high priority level will further appeal to the server 2.

The result is that the client devices 11, 12, 13, 14 with a high priority level will have on average in stock more segments than those with a low priority level, and that the transfer via the peer-to-peer network 10 will be possible from the first ones to the second ones. This is a so-called cascade mechanism which will promote balanced broadcasting of the segments via the peer-to-peer network 10.

It is to be noted that an offset of a few segments can be contemplated with the beginning of the content to allow for a slight "playback" offset, that is a permission of playing delay drift (in the case of live streaming, this makes it possible to avoid that fragments of the content be missed by the user in case of rebuffering: indeed, the player should normally make up for its delay and "skips" the segments corresponding to the playing interruption period, which can cause mistakes. The playback offset enables playing to be resumed where it was been stopped by accepting a slight further delay, generally lower than a predetermined threshold). Playback is not to be confounded with playing in differed time, because the first one is only in the order of a few seconds, is limited and is not controlled by the user, whereas the second one can be of several minutes or even several hours (which means that the associated segments will be nearly incapable of being found in the other peers) and implemented upon request of the user.

Thus, for example, if the $s_k$ first consecutive segments of the content after the $j^{th}$ are considered, there will be the $j+1^{th}$, $j+2^{th}$ ... $j+k^{th}$. Such a case amounts to defining a sub-playlist corresponding to the offset playlist, and those skilled in the art will know how to adapt the invention to such a case.

On the other hand, as explained before, by convenience, the "time" of content can be considered rather than the number of segments (one can switch from one to the other by multiplying by the duration of a segment). Thus, each level kε[1, L] can define a minimum time $t_k$ of the content that has to be stored by the buffer of the device 11, 12, 13, 14, with $t_k=s_k$*duration_segment. If a time is imposed, the number of associated segments corresponds to a rounded up value of this time divided by the duration of the segment.

In the case of live streaming, it has been shown that the sequence of segments making up the content is updated at regular intervals, which means that segments "change". Consequently, it will be well understood that the segments of the minimum lists are defined by their ranks in the playlist, independently of the data which contain these segments. For example, when the $s_k$ first consecutive segments of the content (i.e. the first, the second, the third, ... the $sk^{th}$) or the $t_k$ first seconds of the content are considered, as this is generated in live, these $s_k$ first segments will change at each update of the sequence of the segments making up the content. Yet, immutably, the minimum list will contain the $s_k$ first "current" segments of the content. Therefore, there is no contradiction between minimum lists and dynamic playlists.

In practice, each minimum list of segments of the content defining a level is updated accordingly at each update of the sequence of segments making up the content. Such an update of the list defining a level can again cause the need for the device 14 to download a segment from the server 2. One can for example imagine that for an device with the level k, the $s_k$ first segments have been downloaded from the server 2, and that the $s_{k+1}{}^{th}$ is downloaded from another device, but at a slower speed than the playing speed; upon updating the playlist, the $s_{k+1}{}^{th}$ segment enters the playlist and has to be recovered from the server 2 since it is missing. It will be noted that the device can have only one part of the segment to be recovered from the server 2.

In the case where a slight playback offset occurs, the update of the minimum list takes the added offset into account.

Alternatively to the list of the $s_k$ first consecutive segments of the content, it is for example possible to only consider that the minimum lists "increase", that is that for any segment present in the list of the $k^{th}$ level, it is in the list of the $k+1^{th}$ level ($\forall k \varepsilon [1, L-1], l_k \subset l_{k+1}$).

Figure 2:
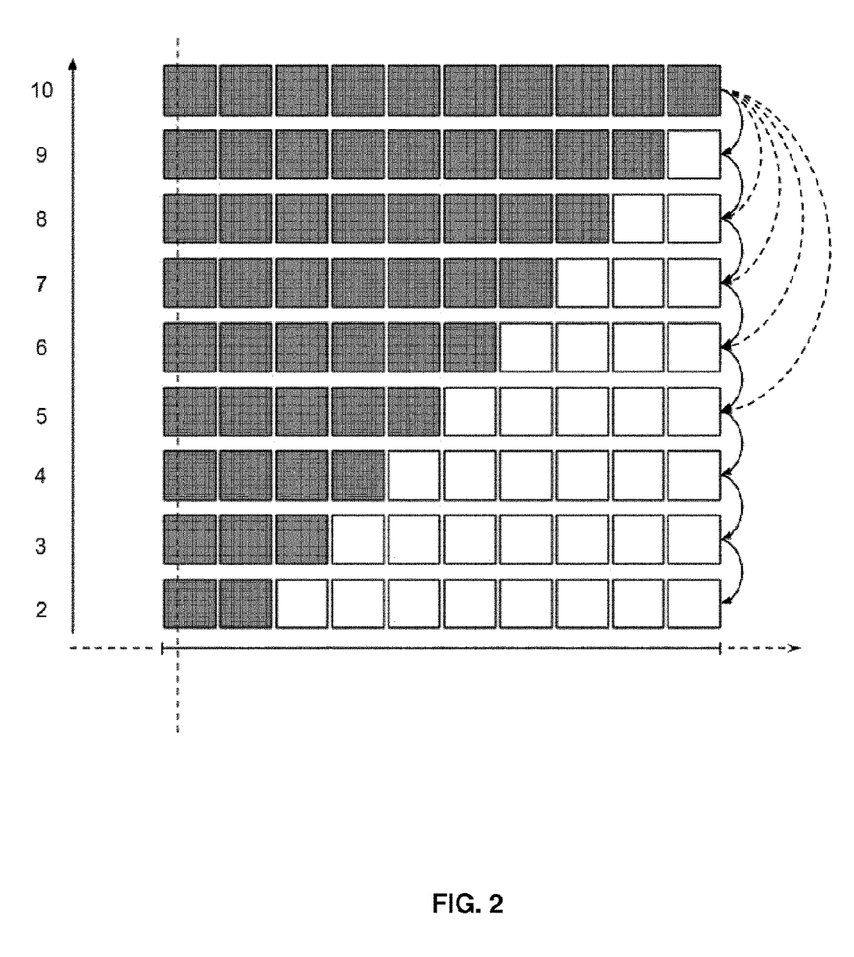
FIG. 2 illustrates priority levels used in one embodiment of the method according to the invention.

FIG. 2 represents an example of organisation by levels (case of live streaming), wherein for each level, the segments that have to be present in the buffer, that is those who are necessarily downloaded from the server 2 are shaded (in opposition, the white segments are those that can be downloaded via the peer-to-peer network 10). In this graph, the time is in abscissa, the vertical dotted line depicting the play position: as time elapses, the segments move from right to left. In this respect, the playlist has a size of ten segments, and on the left thereof, there are the expired segments which have already been played and removed from the playlist, whereas on the right thereof, there are the future segments which have not yet been added. The maximum level which appears is level 10, and $s_k$=k. In other words, the device with level 10 has to store 10 segments at least (that is in this example, a peer with a maximum level has to store in its buffer the entire playlist), the device with level 9 has to store at least 9 segments, etc. This makes that the device with level 9 will recover segments 1 to 9 from the server 2, and segment 10 from an device with level 10, the device with level 8 will recover segments 1 to 8 from the server 2, and segments 9 and 10 from an device with level 9 (or more), etc. The "cascade" mechanism is properly seen.

It is noted that a particularly advantageous embodiment consists in taking $s_k$=k+$s_{min}$, where $s_{min}$ is a minimum value of segments. Indeed, the peers with a minimum level (level 1) have generally more than one segment, generally at least three (i.e. $s_{min}$=2), advantageously the equivalent of 10 s of content (that is $s_{min}$=5 if the duration of a segment is two seconds). By reasoning about the stored content time, if the duration of a segment is duration_segment, therefore there is $t_k$=k+$t_{min}$ the minimum content duration that has to be stored by the buffer of the peer with level k, for example with $t_{min}$=10 s as explained, and [$t_k$/duration_segment] the associated number $s_k$ of segments. It is to be noted that the notion of a rounded value to the upper integer value is important when the duration of a segment is long enough (typically several seconds).

By taking the example of segments of 3 s by ignoring the minimum margin with $t_k$=k (but it is well understood that more generally about 10 s have to be added), if the first segment of the playlist is being played, the end timestamp of which is located at 1.01 s from the playing position (i.e. 1.99 s of the $1^{st}$ segment has been played):

the devices with level 1 have thus to have only the $1^{st}$ segment in the minimum list;

the devices with level 2, 3 and 4 have to have the $1^{st}$ and $2^{nd}$ segments of the content in the minimum list (the end of the $2^{nd}$ segment is at 4.01 s from the playing position);

the devices with level 5, 6 and 7 have to have the first 3 segments in the minimum list (the end of the $3^{rd}$ segment is at 7.01 s from the playing position), etc.

One second later:

the devices with level 1, 2 and 3 have to have the $1^{st}$ and $2^{nd}$ segments of the content in the minimum list (the end of the $2^{nd}$ segment is at 3.01 s from the playing position);

the devices with level 4, 5 and 6 have to have the first 3 segments (the end of the $3^{rd}$ segment is at 6.01 s from the playing position).

In other words, only the minimum lists of levels 1, 4 and 7 have been updated.

Alternatively, it can be taken and considered that the minimum level is not level 1, but for example level 2 or 3, or even count from level 0. In FIG. 2, the minimum level is level 2, and this example will be taken in the following of the description.

Assigning a Level

The efficiency of the present method is maximum when the levels are properly and strategically assigned. For example, if there are too many peers with a low level, the phenomenon of a too large rarity of a segment can occur. Similarly, if there are too many peers with a high level, the server 2 will be unnecessarily prompted (and the P2P underexploited).

Generally, $n_k$ peers with level k could provide enough upload for $n_{k-1}$ peers with level k-1. Therefore, a coefficient C which is the mean ratio which is desirable of the number of peers $n_k$ with level k to the number of peers $n_{k-1}$ with level k-1 should be approached to the maximum.

Step (b) can then consist in identifying the smallest level k$\varepsilon$ [1, L] (where L is the maximum predetermined level) such that $\forall i \varepsilon [k+1, L], n_i > C^* n_{i-1}$, where $n_i$ designates the number of client devices 11, 12, 13 of the peer-to-peer network 10 associated with level i. If the condition is never met, then k=L.

In other words, the processing means 31 of the tracker 3 (it will be seen later that an assignment mode without tracker 3 is possible, even if the use thereof is preferred) initially attempt to assign to the new device 14 the maximum level L by checking whether $n_L \leq C^* n_{L-1}$. If this is not the case (that is that $n_L > C^* n_{L-1}$ and thus that there is sufficient peers with level L), the processing means 31 of the tracker 3 then attempt to assign to the new device 14 the level beyond L-1 by checking whether $n_{L-1} \leq C^* n_{L-2}$, etc. If at the next to last level (i.e. level 3 if the minimum level is level 2), the condition is not met (i.e. $n_3 > C^* n_2$), the minimum level (level 2 in our example) is assigned to the device 14.

C, which designates as explained the target ratio of devices by switching from one level to the next one, is a coefficient depending on the state of the network 1 calculated by the tracker 3. It can be calculated depending on the geographical zone, the nature of the server 2, etc. Preferably, the tracker 3 questions the devices 11, 12, 13, 14 to know the download percentage made in P2P, and modifies C accordingly. In practice, C can be a coefficient close to 1 with a lower value, for example 0.95, which reflects that peers with high levels remain fewer in number than those with a low level.

In one example with 2 levels with C=1, there could be two peers of level 3, and one peer of level 2. By assuming that the devices 11 and 12 are of level 3 and that the device 13 is of level 2, the device 14 would be assigned level 2 since the condition $n_3(=2) \le C^*n_2(=1^*1)$ is not met, that is there are enough peers of level 3, and the new device 14 is assigned the minimum level (level 2).

Alternatively, an arbitrary level (for example the maximum level) can be assigned to the new client device 14, and subsequent modifications of this level occur (this will be seen in more detail hereinafter), even if the initial assignment of the "strategic" level is preferred.

It is to be noted that if the implementation of a playback offset is permitted, two devices with a same level may not have to download the same segment (in terms of "data" and not rank) exactly in the meantime (since this is with respect to the playing position, which differs depending on the offset due to playback).

Advantageously, the offset time (for example expressed as segments) is taken into account in the assignment and possibly the time change of the level of an device. For example, to a new device 14 having little or no offset, a higher level can be assigned to further increase the offset with more delayed devices, which will be reassigned to lower levels.

Exchanging Levels

The peer-to-peer network 10 permanently changes over time by virtue of connections and disconnections of client devices 11, 12, 13, 14. The connection of new devices normally enables the population of each of the levels to be regulated, but it is understood that not all the client devices are equal and that it is desirable in the interest of the peer-to-peer network 10 that some (for example those having a high upload ability) rather than others are associated with a high level.

Thus, advantageously, step (c) comprises exchanging levels between the new client device 14 and another client device 11 with a different level.

In the previously discussed example, the device 14 has level 2 whereas the device 11 is of a higher level (level 3). Yet, as can be seen in FIG. 1, this is a smartphone (the connection of which is likely to be limited). Reversing levels is thus desirable. It is noted that such a reversal does not change populations, but simply places the "best" peers at the highest levels, that is the levels in which they are more appealed to by the peer-to-peer network 10.

Preferably, the choice of the reversals passes though calculating (by the tracker 3 directly, or by the devices 11, 12, 13, 14) a "heuristic", that is an encrypted parameter enabling the ability of a peer to be of a high level to be evaluated, in other words the interest for this network that this peer is of a high level to be evaluated. Thus, in an optimum distribution, the heuristic increases with the level. Various examples of heuristics will be seen later.

In particular, for each client device 11 with a different level from the new client device 14 and the new client device 14 (in practice all the devices 11, 12, 13, 14 at regular intervals) a heuristic $H_{11}$, $H_{14}$ is calculated, the new client device 14 exchanging levels with another client device 11 with a different level if the heuristic $H_{11}$ of the client device with the highest level 11 is lower than the heuristic $H_{14}$ of the client device with the lowest level 14 . In other words, if the heuristic $H_{14}$ of the device 14 (with level 2 in our example) is higher than the heuristic $H_{11}$ of the device 11 (with level 3), then the latter should exchange levels.

The peers can calculate their own heuristic H, but preferably each client device 11, 12, 13, 14 calculates the heuristic H of other devices 11, 12, 13, 14, in particular of those which provide segments to it ("seeders" thereof). To compare the heuristics H, the peer with the highest level advantageously requests its own heuristic H to each peer with a lower level to which it provides segments ("leechers" thereof), and calculates the average thereof.

If the tracker 3 (or the client devices 11, 12, 13, 14 themselves) notices that it is desirable that several peers exchange with a peer with a higher level, it is that of which the heuristic is maximum which benefits from the reversal. Generally, it will be understood that the reversals tend to increase peers with the best heuristics (the highest ones) in level, and decrease those with the worst (lowest) heuristics.

Heuristics

As explained, a first simple possible heuristic corresponds to an estimate of the upload limit (in other words, the maximum uplink rate of the client device).

Preferably, a heuristic is used which measures "the efficiency" of the peer, in other words its ability to emit many segments. H of a client device 11, 12, 13, 14 can thus be expressed (in particular by another client device 11, 12, 13, 14 to which it provides segments, that is a "leecher") depending on a counter of segments (possibly expressed as the number of segment chunks) which are transmitted (to the peer calculating the heuristic H of the client device 11, 12, 13, 14, "seeder") and a counter of timeouts for said client device 11, 12, 13, 14, in particular by the formula (emitted segment counter)/(emitted segment counter+timeout counter). It is noted that the denominator corresponds to the number of requests of segments (or segment chunks) received by the peer of which the heuristic H is calculated from the peer which calculates the heuristic H.

This formula brings satisfaction, but it is understood that a peer that has served 200/250 segment chunks should have a higher heuristic than that which has served 3/3 thereof.

For this, calculating the heuristic H of a client device 11, 12, 13, 14 can comprise steps of:
  initialising the heuristic H of the client device 11, 12, 13, 14 at a mean value (in particular 0.5);
  regularly updating (for example every second, or at each occurrence of a new segment) the heuristic H of the client device 11, 12, 13, 14 depending on an emitted segment (or segment chunks) counter and a timeout counter for said client device 11, 12, 13, 14.

More precisely, H may be recursively defined. By noting $H_{new}$ and $H_{old}$ the new and old values of the heuristic and h the ratio (emitted segment counter)/(emitted segment counter+timeout counter), there is $H_{new}=f(H_{old}, h)$.

The relationship can be a linear combination: by defining a weight p (0<p<1) enabling past conditions on the peer-to-peer network 10 to be taken into account (and possibly the global number of requests of segments performed from the device 11, 12, 13, 14 for which the heuristic is attempted to be calculated), the heuristic can be obtained by the formula $H_{new}=p^*h+(1-p)^*H_{old}$.

This algorithm makes it possible to converge to an optimum value of segment request number for each client device 11, 12, 13, 14: more segments are requested to the most efficient peers (they have a good heuristic, therefore their level raises). If their outflow (upload) rate saturates, they will not succeed in satisfying all the requests, a number of which will expire, hence h decreases and consequently the heuristic and thus the level decrease. Less segments thereby will be requested thereto.

It is to be noted that under some conditions an device 11, 12, 13, 14 can no longer take the calculated heuristic into account when it is no longer relevant, (and the peer level becomes minimum, which corresponds to a fixed minimum number of segments in the playlist). In some cases, the device 11, 12, 13, 14 not using the heuristic anymore can be given a slightly higher level to avoid "rebuffering" events, that is an interruption until missing segments are recovered from the server 2.

This phenomenon can be desirable for example if the user wishes to play the content with some delay over the rest of the peers (playing in differed time), insofar as it will not store "contemporary" segments the other peers need. Thereby, it is no longer necessary to introduce artificially an offset between the server downloadings of different client devices 11, 12, 13, 14 to make broadcasting of segments between peers easier.

Some content servers 2 in live streaming thus accept some delay (today up to 8 h, in general between 20 min and one hour), i.e. the playlist does not stop at the playing point and past segments are only deleted after a while, which allows for offset playing.

It is noted that the peer in differed playing can always recover data via the peer-to-peer network 10 from the peers in differed playing which are in front of it, as well as those performing live playing if it has not too high a playing delay.

Sliding Levels

Alternatively, a less computational priority management mode is possible, this is the sliding level mode, or "turnover". It can turn out to be less optimum than the embodiments described in the previous part, but it is efficient and does not necessarily require to resort to the tracker 3. Indeed, the client devices themselves can manage the time change of levels.

In this mode, after the first level assignment has been made to the new device 14 (either by the tracker 3, or preferably arbitrary by the client device 14 itself: in particular the maximum level), at each new segment in the playlist (i.e. at each dynamic update of the sequence of segments), the level decreases, provided that this is beyond a minimum threshold (this threshold corresponds to a predetermined minimum duration of the content that has to be stored on the buffer of each device), which can correspond to level 2 of our example (the lowest). Alternatively, a threshold depending on a heuristic can be set, similarly to what has been previously discussed.

Regardless of the level, as long as a segment has to be downloaded from the server 2, the peer is again assigned the maximum level, which forces it to fill again its buffer from the server 2. From this, the level will go down again, hence the turnover.

Stated otherwise, at each update of the sequence of the segments:
 if each segment of the content belonging to said list of segments of the content corresponding to the level assigned to the new client device 14 is present in the buffer of the new client device 14 (i.e. the minimum list of segments is met), decreasing the level assigned to the new device 14 as long as said level remains above a minimum level (in our example level 2),
 if at least one segment of the content belonging to said list of segments of the content corresponding to the level assigned to the new client device 14 is absent from the buffer of the new client device 14 (i.e. at least one segment has to be downloaded from the server 2), assigning to the new device 14 a maximum level (level 10 in our example).

Computer Program Product

According to other aspects, the invention relates to a computer program product comprising code instructions for executing (on data processing means, in particular those of the client device 14) a method according to the first aspect of the invention of broadcasting a content in streaming in a peer-to-peer network 10 of client devices 11, 12, 13 which is connected to a content server 2, as well as storage means readable by a computing device (for example a memory of this client device 14) on which this computer program product is found.

The invention claimed is:

1. A method of broadcasting a content by streaming in a peer-to-peer network of client devices which is connected to a content server, said content including a sequence of segments stored in data storage means of the content server, each client device comprising a buffer storing in a temporary manner at least one segment of said content, wherein each client device is associated with a level, the client devices being classified in L levels, each level k ε [1, L] defining a minimum list of segments of the content corresponding to a minimum duration $t_k$ of the content, that have to be stored by the buffer of the device, the method comprising steps of:
 (a) connecting a new client device to the peer-to-peer network;
 (b) assigning one of said levels to the new client device as a function of the number of client devices associated with each level;
 (c) transmitting to said new client device from the content server and storing in the buffer of said new client device at least each segment of the content which is absent from the buffer of the new client device, which belongs to said list of segments of the content corresponding to the level assigned to the new client device.

2. The method according to claim 1, wherein step (c) comprises transmitting to said new client device from client devices associated with a level higher than the level assigned to said new client device at least one segment of the content which is absent from the buffer of the new client device, which does not belong to said list of segments of the content corresponding to the level assigned to the new client device.

3. The method according to claim 1, wherein the peer-to-peer network is further connected to a pair management server configured to manage transmitting segments between client devices, step (b) being implemented by the pair management server.

4. The method according to claim 1, wherein step (a) comprises directly transmitting to said new client device from the content server at least one first segment of the content.

5. The method according to claim 1, wherein step (b) consists in identifying and assigning to the new client device the smallest level k ε [1, L] such as ∀i ε [k+1, L], $n_i > C^* n_{i-1}$, where $n_i$ designates the number of client devices of the peer-to-peer network associated with the level i.

6. The method according to claim 5, wherein C is a coefficient depending on the state of the network calculated by the pair management server.

7. The method according to claim 1, wherein the content is broadcast live, the sequence of segments making up the content being updated at regular intervals such that at each update, the first segment of the sequence is deleted, and a new segment is added at the end of the sequence.

8. The method according to claim 7, wherein each minimum list of segments of the content defining a level is updated accordingly at each update of the sequence of segments making up the content.

9. The method according to claim 8, comprising at each update of the sequence of segments:
- if each segment of the content belonging to said list of segments of the content corresponding to the level assigned to the new client device is present in the buffer of the new client device, decreasing the level assigned to the new device as long as said level remains above a minimum level,
- if at least one segment of the content belonging to said list of segments of the content corresponding to the level assigned to the new client device is absent from the buffer of the new client device, assigning a maximum level to the new device.

10. The method according to claim 7, wherein a client device has a content playing delay with respect to the new client device, step (c) comprising decreasing the level assigned to said delayed device.

11. The method according to claim 1, wherein step (c) comprises exchanging level between the new client device and another client device with a different level.

12. The method according to claim 11, wherein for each client device with a different level from the new client device and the new client device, a heuristic is calculated, the new client device exchanging levels with another client device with a different level if the heuristic of the client device with the highest level is lower than the heuristic of the client device with the lowest level.

13. The method according to claim 12, wherein calculating the heuristic H of a client device comprises the steps of:
- initialising the heuristic H of the client device to a mean value;
- regularly updating the heuristic H of the client device depending on a received segment counter and a timeout counter for said client device.

14. A non-transitory computer readable medium comprising code instructions for executing a method according to claim 1 of broadcasting a content by streaming in a peer-to-peer network of client devices which is connected to a content server, when said code instructions are executed by a computer.

15. A non-transitory computer readable medium having stored thereon a computer program comprising code instructions for executing by a computing device a method according to claim 1 of broadcasting a content in streaming by a peer-to-peer network of client devices which is connected to a content server.

\* \* \* \* \*